3,102,073
IMIDAZOLINE ANTHELMINTIC COMPOSITIONS AND METHOD OF USING SAME
Edward B. Hodge, Terre Haute, Ind., assignor to Commercial Solvents Corporation, New York, N.Y., a corporation of Maryland
No Drawing. Filed Feb. 3, 1961, Ser. No. 86,849
24 Claims. (Cl. 167—53)

My invention relates to a process for the destruction of parasitic nematodes in animals. More particularly my invention relates to compositions for destroying parasitic nematodes having an imadazoline as the active ingredient.

The infestation of meat-producing animals such as swine and cattle by parasitic nematodes results in great economic loss every year. Great numbers of various nematodes such as *Ascaris suis*, Oesophogostoma and *Trichuris suis* enter the alimentary tract of a host animal under normal feeding and grazing circumstances and thereupon begin their parasitic activity. These parasites seldom, if ever, result directly in the death of the host animal but often leave the animal in a weakened condition thus making it more susceptible to illness caused by other organisms. The infestation of nematodes even in small numbers moreover is harmful to even the most healthy of animals causing loss of appetite with a resulting slower rate of growth.

Previously, many materials have been recommended as anthelmintic agents, the term usually given to compositions which aid in the destruction of parasitic nematodes in a living animal. A great many of these materials however have proven not to be practical anthelmintic agents due to lack of ready availability, cost, failure of acceptance by the animal, lack of effectiveness in small amounts, etc. Also, some of the agents, while effective against one or several types of nematodes proved to be relatively ineffective on other nematodes when used in practical quantities. In addition, particular anthelmintic agents while totally effective against large numbers and kinds of nematodes have a adverse effect on the animal often causing chronic vomiting and even deafness. But even more importantly most anthelmintic agents which have none of the above-mentioned drawbacks prove to be effective only when used over long periods of time thus not only increasing the cost of their use but allowing slower weight gain or even loss of weight to the animal during the treatment period.

I have now discovered a process for ridding animals such as swine and cattle of parasitic nematodes in a relatively short period of time. My process is both safe and economical and can be used satisfactorily under normal feeding conditions. My process consists of feeding the animals small but effective amounts of an imidazoline compound having the following formula:

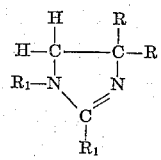

wherein R is a member selected from the group consisting of hydrogen and lower alkyl radicals and $R_1$ is alkyl. Examples of the imidazolines useful in my invention include 1-isopropyl-2-heptadecyl-4,4-dimethyl-2-imidazoline, 1 - ethyl - 2-octyl-4,4-dimethyl-2-imidazoline, 1-butyl-2-nonyl-4,4-dimethyl-2-imidazoline, 1-propyl-2-heptadecyl-4,4-dimethyl-2-imidazoline, etc.

The exact quantity of the above compounds which should be ingested in the animal in a given day will vary widely and to an extent will depend on the nature of the feed in which the compound is incorporated and the type of nematode to be expelled. Generally, I have found that animals can be rid of nematodes when treated by my process in approximately two-days feeding when from about 25 to about 200 milligrams per kilogram of body weight of the above compounds are ingested per day of feeding. Generally, I have found optimum results are obtained when from about 50 to about 100 milligrams per kilogram of body weight of my anthelmintic compositions are utilized. If desired, however, lower amounts of my anthelmintic compositions and longer periods of feeding can be utilized.

My anthelmintic agents can be fed to animals in any convenient manner. For example, as part of a complete feed or as part of a feed supplement such as a protein supplement. Generally when I employ anthelmintic feed compositions containing from about 500 to about 4,000 parts per million by weight based on the weight of my anthelmintic feed composition the animal will completely accept the feed and under normal eating habits will consume the desired daily amount of anthelmintic agent. For optimum acceptance and results, however, I prefer anthelmintic feed compositions containing from about 1,000 to about 3,000 parts per million by weight of my compounds.

The following examples are given to illustrate my invention, but it is not intended that my invention be limited to the procedures, amounts of active ingredients or described rations, but rather it is intended that all equivalents obvious to those skilled in the art be included within the scope of my invention.

*Example I*

Four pigs known to be infested with parasitic nematodes were separately fed a complete feed containing as the active anthelmintic ingredient 1-isopropyl-4,4-dimethyl-2-heptadecyl-2-imidazoline for a two-day period during which period approximately 100 milligrams per kilogram of body weight of the active anthelmintic ingredient were ingested. The tests were carried out utilizing as a feed source, a swine feed having the following composition:

| | |
|---|---|
| Corn percent | 40.7 |
| Meat and bone scrap do | 1.2 |
| Soybean meal do | 6.2 |
| Alfalfa meal do | 1.2 |
| Limestone do | .3 |
| Dicalcium phosphate do | .2 |
| Sodium chloride do | .2 |
| Trace mineral mix do | 11.5 |
| Vitamin $D_2$ supplement do | 1.7 |
| Riboflavin supplement do | 4.5 |
| Calcium pantothenate supplement do | 1.8 |
| Niacin supplement do | .3 |
| Choline supplement do | 11.5 |
| Vitamin $B_{12}$ supplement do | 18.5 |
| 1 - isopropyl-4,4-dimethyl-2-heptadecyl-2-imidazoline p.p.m. | 2000 |

Throughout the two-day tests, feces from the pigs were shown to contain nematodes. At the end of the test period the pigs were slaughtered and the intestines stripped. Stripping of the intestines revealed that no nematodes were left at the completion of the test thus demonstrating 100% effectiveness of my anthelmintic composition in expelling nematodes from the animal.

*Example II*

Feeding tests were conducted using the procedures of Example I with the exception that 2,000 parts per million of 1-ethyl-2-octyl-4,4-dimethyl-2-imidazoline was utilized instead of 1-isopropyl-4,4-dimethyl-2-heptadecyl-2-imidazoline. Results similar to those of Example I were obtained.

*Example III*

Feeding tests were conducted using the procedures of Example I with the exception that 2,000 parts per million of 1-propyl-2-heptadecyl-4,4-dimethyl-2-imidazoline were used instead of 1-isopropyl-4,4-dimethyl-2-heptadecyl-2-imidazoline. Results similar to those of Example I were obtained.

*Example IV*

Feeding tests were conducted using the procedures of Example I with the exception that 2,000 parts per million of 1-butyl-2-nonyl-4,4-dimethyl-2-imidazoline were utilized instead of 1-isopropyl-4,4-dimethyl-2-heptadecyl-2-imidazoline. Results similar to those of Example I were obtained.

Now having described my invention, what I claim is:

1. An anthelmintic feed composition comprising animal feed and containing as an essential active ingredient small but effective amounts of a nematocidal imidazoline having the formula

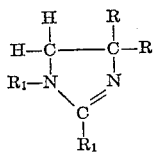

wherein R is a member selected from the group consisting of hydrogen and lower alkyl radicals and $R_1$ is alkyl.

2. The composition of claim 1 wherein the feed contains from about 500 to about 4,000 parts per million of imidazoline.

3. The composition of claim 1 wherein the feed contains from about 1,000 to about 3,000 parts per million of imidazoline.

4. The composition of claim 1 wherein the imidazoline is 1-isopropyl-4,4-dimethyl-2-heptadecyl-2-imidazoline.

5. The composition of claim 1 wherein the imidazoline is 1-propyl-2-heptadecyl-4,4-dimethyl-2-imidazoline.

6. The composition of claim 1 wherein the imidazoline is 1-butyl-2-nonyl-4,4-dimethyl-2-imidazoline.

7. The composition of claim 1 wherein the imidazoline is 1-ethyl-2-octyl-4,4-dimethyl-2-imidazoline.

8. The composition of claim 1 wherein R is a lower alkyl radical.

9. The composition of claim 8 wherein the lower alkyl radical is a methyl radical and feed contains from about 500 to about 4000 parts per million of imidazoline.

10. A process for the treatment of intestinal nematode infestations which comprises administering to the host of the nematode during a daily administration period from about 25 to about 200 milligrams per kilogram of body weight of the host of an imidazoline containing the following formula:

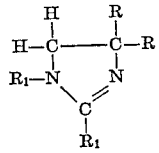

wherein R is a member selected from the group consisting of hydrogen and lower alkyl radicals and $R_1$ is alkyl.

11. The process of claim 10 wherein the amount of imidazoline administered in a daily period ranges from about 50 to about 100 milligrams per kilogram of body weight.

12. The process of claim 10 wherein R is a lower alkyl radical.

13. The process of claim 12 wherein the lower alkyl radical is a methyl radical.

14. A process for expelling intestinal nematodes from a host animal infested with nematodes which comprises feeding the nematode infested host a feed containing a small but effective amount of an imidazoline having the following formula

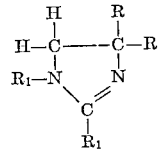

wherein R is selected from the group consisting of hydrogen and lower alkyl radicals and $R_1$ is alkyl the said feed being fed in amounts such that the host receives in a daily feeding from about 25 to about 200 milligrams per kilogram of body weight of the host of imidazoline.

15. The process of claim 14 wherein the amount of imidazoline received by the host in a daily feeding ranges from about 50 to about 100 milligrams per kilogram of body weight.

16. The process of claim 14 wherein the imidazoline is 1-isopropyl-4,4-dimethyl-2-heptadecyl-2-imidazoline.

17. The process of claim 14 wherein the imidazoline is 1-ethyl-2-octyl-4,4-dimethyl-2-imidazoline.

18. The process of claim 14 wherein the imidazoline is 1-butyl-2-nonyl-4,4-dimethyl-2-imidazoline.

19. The process of claim 14 wherein the imidazoline is 1-propyl-2-heptadecyl-4,4-dimethyl-2-imidazoline.

20. A process for expelling intestinal nematodes from a host animal which comprises feeding the nematode infested host a feed containing from about 500 to about 4,000 parts per million of an imidazoline compound having the following formula:

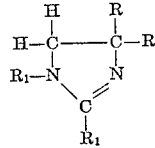

wherein R is a member selected from the group consisting of hydrogen and lower alkyl radicals and $R_1$ is alkyl the said feed being fed in such amounts so that the host receives in a daily feeding from about 25 to about 200 milligrams per kilogram of body weight of imidazoline.

21. The process of claim 20 wherein the imidazoline is 1-isopropyl-4,4-dimethyl-2-heptadecyl-2-imidazoline.

22. The process of claim 20 wherein the imidazoline is 1-ethyl-2-octyl-4,4-dimethyl-2-imidazoline.

23. The process of claim 20 wherein the imidazoline is 1-butyl-2-nonyl-4,4-dimethyl-2-imidazoline.

24. The process of claim 20 wherein the imidazoline is 1-propyl-2-heptadecyl-4,4-dimethyl-2-imidazoline.

References Cited in the file of this patent

UNITED STATES PATENTS 2,418,077    Kyrides  ---------------  Mar. 25, 1947

OTHER REFERENCES

Chem. Abst., Fifth Decennial Index, vol. 41–50, 1947–1956, Subjects Hy-Ly, pages 6500S to 6504S.

Arens: Chem. Abst., vol. 52, 1958, p. 8212g.